United States Patent
O'Connor et al.

(10) Patent No.: US 9,936,077 B2
(45) Date of Patent: Apr. 3, 2018

(54) METHODS FOR THE ENCODING OF PARTICIPANTS IN A CONFERENCE

(71) Applicant: Interactive Intelligence, Inc., Indianapolis, IN (US)

(72) Inventors: Kevin O'Connor, Saint Augustine, FL (US); Felix Immanuel Wyss, Zionsville, IN (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 14/451,453

(22) Filed: Aug. 5, 2014

(65) Prior Publication Data
US 2015/0036552 A1  Feb. 5, 2015

Related U.S. Application Data

(60) Provisional application No. 61/862,113, filed on Aug. 5, 2013.

(51) Int. Cl.
| | |
|---|---|
| *H04M 3/56* | (2006.01) |
| *H04M 7/00* | (2006.01) |
| *H04L 29/06* | (2006.01) |
| *H04W 4/00* | (2018.01) |

(52) U.S. Cl.
CPC .......... *H04M 3/568* (2013.01); *H04L 65/403* (2013.01); *H04L 65/605* (2013.01); *H04M 7/006* (2013.01); *H04M 7/0072* (2013.01); *H04W 4/00* (2013.01)

(58) Field of Classification Search
USPC ....................................................... 370/260
See application file for complete search history.

(56) References Cited

U.S. PATENT DOCUMENTS

| | | | |
|---|---|---|---|
| 5,893,067 A | 4/1999 | Bender et al. | |
| 5,991,277 A * | 11/1999 | Maeng et al. | ........... 370/263 |
| 6,211,919 B1 * | 4/2001 | Zink et al. | ........... 348/473 |
| 6,650,745 B1 | 11/2003 | Bauer et al. | |
| 6,711,602 B1 | 3/2004 | Bhandal et al. | |
| 8,320,391 B2 | 11/2012 | Ohmuro et al. | |
| 2003/0063574 A1 | 4/2003 | Virolainen | |
| 2004/0076277 A1 * | 4/2004 | Kuusinen et al. | ....... 379/202.01 |

(Continued)

OTHER PUBLICATIONS

International Search Report issued in related PCT application PCT/US14/49655, dated Nov. 28, 2014.

(Continued)

*Primary Examiner* — Mohammad Anwar
*Assistant Examiner* — Angel Brockman
(74) *Attorney, Agent, or Firm* — Lewis Roca Rothgerber Christie LLP

(57) ABSTRACT

A system and method are presented for the encoding of participants in a conference setting. In an embodiment, audio from conference participants in a voice-over-IP setting may be received and processed by the system. In an embodiment, audio may be received in a compressed form and de-compressed for processing. For each participant, return audio is generated, compressed (if applicable) and transmitted to the participant. The system may recognize when participants are using the same audio encoding format and are thus receiving audio that may be similar or identical. The audio may only be encoded once instead of for each participant. Thus, redundant encodings are recognized and eliminated resulting in less CPU usage.

29 Claims, 2 Drawing Sheets

(56) References Cited

U.S. PATENT DOCUMENTS

| | | | |
|---|---|---|---|
| 2006/0188128 A1* | 8/2006 | Rhoads | 382/100 |
| 2006/0245378 A1* | 11/2006 | Jeong et al. | 370/261 |
| 2006/0247045 A1 | 11/2006 | Jeong et al. | |
| 2007/0274540 A1 | 11/2007 | Hagen et al. | |
| 2010/0020954 A1* | 1/2010 | Gilg | H04M 3/56 |
| | | | 379/202.01 |
| 2013/0066641 A1 | 3/2013 | Bruhn | |
| 2013/0169742 A1 | 7/2013 | Wu et al. | |

OTHER PUBLICATIONS

Extended European Search Report for corresponding Application No. 14835327.9, dated Mar. 9, 2017 (10 sheets).
Japanese Office Action with English Translation for Application No. 2016-533367, dated Jan. 30, 2018, 8 pages.

* cited by examiner

METHODS FOR THE ENCODING OF PARTICIPANTS IN A CONFERENCE

BACKGROUND

The present invention generally relates to telecommunications systems and methods, as well as voice-over-IP conference calls. More particularly, the present invention pertains to recognizing and eliminating redundant operations, such as encodings, of conference participants.

SUMMARY

A system and method are presented for the encoding of participants in a conference setting. In an embodiment, audio from conference participants in a voice-over-IP setting may be received and processed by the system. In an embodiment, audio may be received in a compressed form and de-compressed for processing. For each participant, return audio is generated, compressed (if applicable) and transmitted to the participant. The system may recognize when participants are using the same audio encoding format and are thus receiving audio that may be similar or identical. The audio may only be encoded once instead of for each participant. Thus, redundant encodings are recognized and eliminated resulting in less CPU usage.

In one embodiment, a method is presented for reducing computational complexity of participants in a conference communication setting through recognition and elimination of redundant operations, wherein said method comprises the steps of: a) receiving audio for participants to the conference communication setting by a means for signal processing; b) determining a state for each participant, by the means for signal processing; c) processing, by a conference system, said audio to generate return audio for each participant, wherein said processing comprises: recognizing the conference participants using similar audio encoding formats and which are receiving similar audio; and encoding said similar audio for participants having similar attributes, whereby the redundant operations are eliminated; and d) transmitting, by the conference system, said return audio to said participants, wherein said participants having similar attributes receive the return audio with eliminated redundant operations.

In another embodiment, a method is presented for reducing computational complexity of participants in a voice-over-IP conference call setting through recognition and elimination of redundant encodings, wherein said method comprises the steps of: a) receiving an alert from a signal processor when a participant begins producing sound; b) adding said participant, by the signal processor, to a listing of active participants, wherein said active participants are producing sound; c) determining, by the signal processor, if the sound from said participant is speech, wherein the participant is removed from the listing if said sound is determined not to be speech; d) recognizing, by a conference system, if participants who are determined to not be active are using a similar audio encoding format and are receiving similar audio; e) encoding, by the conference system, said similar audio for all participants who are not active to reduce redundancy; and f) preparing and writing, by the conference system, said encoded audio to each participant associated with an encoder instance.

DETAILED DESCRIPTION

Figure 1:
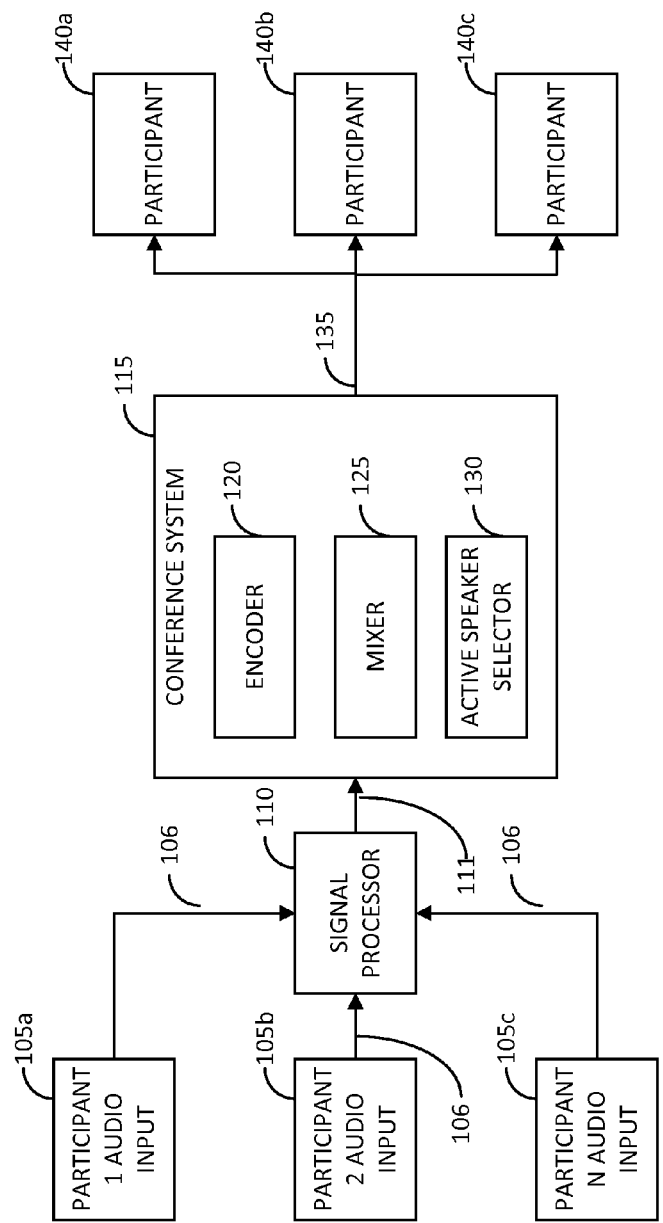
FIG. 1 is a diagram illustrating an embodiment of a system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

An audio conference may be a communication, such as a voice call or a video conference, for example, with at least two participants. Any participant may speak and each participant can hear the combined audio of all other conference participants. Combining the audio of all participants is undesirable because there may be only a small number of participants speaking at a given time. The non-speaking participants may only be contributing background noise. As the number of conference participants increases, such background noise may become more noticeable. Modern conferencing implementations may combine only the speaking participants, determined by applying a voice activity detector algorithm to each participant. As such, all participants not currently speaking will receive the same audio.

Limiting the conference audio to a set of participants currently speaking may result in the effect that all non-speaking participants receive exactly the same audio (the combination of speaking participants). For example, in a conference setting with ten parties, all parties, except the tenth, are silent. Thus, parties one through nine hear the same audio (that of party ten). In another example, if all parties were silent except nine and ten, the parties one through eight would hear the same audio (a combination of parties nine and ten). Participants using the same audio encoding format, and receive identical audio, are recognized and the audio is encoded once instead of for each participant. In an embodiment, redundant operations, such as encodings, may be recognized and eliminated on a packet by packet basis for participants in a voice-over-IP conference setting.

Encoded audio may only be shared by participants receiving the same conference audio. In an embodiment, conference participants sharing the same encoded audio should be using the same attributes, such as compression format, packetization size, gain setting, and IVR audio input. The possible choices for each of these attributes may be encoded into an integer identifying the attribute value. The integers for these attributes may be combined to form an attribute signature. Participants who receive the same conference audio and have a similar, or the same, attribute signature will receive the same encoded audio. A signature may be formed as a 64-bit unsigned integer with bit ranges reserved for each attribute. While any order and bit range is within the scope of an embodiment, the following is a non-limiting example:

IVR/Auxiliary audio source for bits 0-15;
Gain setting for bits 16-23;
Packetization size for bits 24-27;
Audio compression format options for bits 28-35;
Audio compression format identifier for bits 36-51; and
Reserved for bits 52-65.

FIG. 1 illustrates an embodiment of a conference setting, indicated generally at 100. Participants 105 may provide Audio Input 106 into the conference system 115. The input passes through the Signal Processor 110. While three participants are shown for simplicity, it is within the scope for any number of participants to be present. Generally, participants may be active or passive within the conference (e.g., speaking or non-speaking).

The Signal Processor 110 comprises means that performs several functions. In an embodiment, the Signal Processor 110 uses Voice Activity Detection to detect the presence of speech in order to determine which parties are currently speaking at any given time. It should be noted that the speaker state may be different than the instantaneous state from the Signal Processor 110. For example, when a participant stops producing audio, the conference system may still consider the participant an active speaker for a short set time (such as 1-2 seconds). Speech detection may be performed individually for each party. In another embodiment, the signal processor removes echo. Specifically, the echo of the audio sent to the participant may be removed. In another embodiment, automatic level control may be used to boost the volume of lower parties and reduce the volume of louder parties. In yet another embodiment, noise reduction may be performed. Non-speech noise may be filtered out of a party's audio in order to improve overall conference quality. Processed Audio 111 is sent to the Conference System 115.

The Conference System 115 may comprise an Encoder 120, a Mixer 125, and Active Speaker Selector 130. The Encoder 120 may compress audio received from Participants 105. In an embodiment, audio compression is performed to reduce the size of the transmitted audio.

The Mixer 125 may operate on a set time interval, which may be determined at runtime. In an embodiment, the time interval may be in milliseconds (ms), such as 10 ms or 20 ms. The Mixer 125 comprises means which may associate participants, both speaking and non-speaking with an encoder instance, as described in greater detail in FIG. 2 below.

The Active Participant Selector 130 determines the status of Participants 105 in the conference setting. In an embodiment, conference participants may be active, such as by speaking, or non-active in the communication. The determination may be made, for example, based on audio segment(s), the current state of a participant, the prior state of a participant, the prior state of a participant related to the speaking state of another participant, and the conference settings.

An audio segment may comprise the audio contained in an interval currently being processed. The audio segment is a result of the signal processor's voice activity detection for a time interval, such as 10 or 20 ms. The current state of a participant may comprise whether or not a participant is speaking in the time interval while the prior state of a participant may comprises whether or not a participant was speaking in the previous time interval. When there are more participants in the speaking state than the conference settings allow, it should be determined which of the speaking participants contribute to the combined speaker audio. The determination may be made by comparing the current and previous states of participants, including how long the participants have been in their respective states. In an embodiment, if a conference is limited to a maximum of three active speakers and four participants are currently speaking, the three that have been speaking the longest may be selected for the combined audio. The conference settings may comprise the settings necessary to select the correct participants at each mixer interval, such as the minimum and maximum number of active speakers, how long a speaker remains in the various states, etc.

Audio Output 135 is sent from the Conference system 115 to the Participants 140. The Audio Output 135 may contain encoded audio with unique encoder instances. The Participants 140 may comprises non-speaking participants. While only three participants 140 are shown for simplicity, it is within the scope for any number of participants to be present. It should also be noted that participants may transition from speaking to non-speaking and vice versa.

Figure 2:
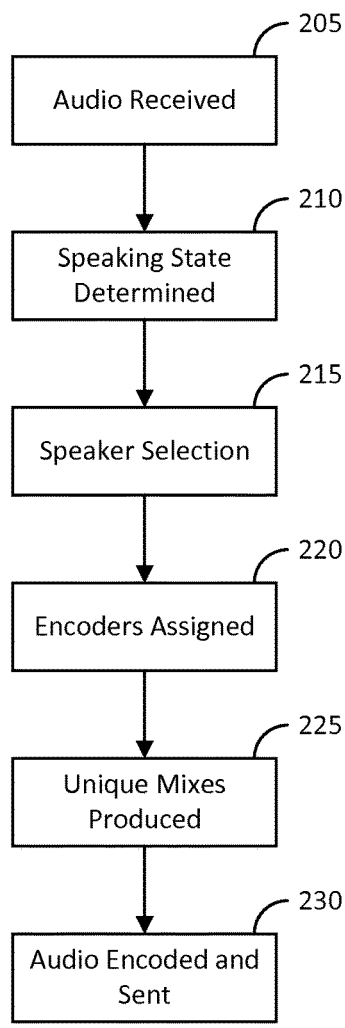
FIG. 2 is a flowchart illustrating an embodiment of a process for associating a participant with an encoder instance.

FIG. 2 describes the process 200 of associating a participant with an encoder instance. This process may be operable in the conference mixer 125 of system 100.

In operation 205, audio is received. For example, a segment of audio is read from each participant. The audio segment may be equal to a pre-determined time interval. Control is passed to operation 210 and process 200 continues.

In operation 210, the audio and encoding format are analyzed to determine speaking state. For example, the speaking state of a conference participant is determined based on the analysis of the audio segment and the prior state of the participant. Control is passed to operation 215 and process 200 continues.

In operation 215, speaker selection occurs. For example, all parties to the conference and the conference settings are examined to decide which parties are treated as active speakers for a given interval as determined by the signal processor. The conference participants may be divided into a number of sets based on whether or not speech has been detected. In one embodiment, there may be two sets comprising speaking participants and non-speaking participants. The sets may also be referred to as contributing and non-contributing. In an embodiment, a participant may contribute without speaking in order to meet the minimum contributing participants in a conference configuration. In another embodiment, participants that are speaking may not be considered contributing because of the maximum active speaker setting in the conference configuration. Control is passed to operation 220 and process 200 continues.

In operation 220, encoders are assigned. For example, encoder instances are assigned based on the set formed in operation 215 (e.g. contributing, non-contributing, etc.). In an embodiment, encoder instances may be assigned based on whether the participant is a contributing (or speaking) participant or a non-contributing (or non-speaking) participant. If a participant is in the speaking set, or the speaking state, and is currently assigned an encoder instance that is shared with other participants, then the participant may be assigned a new, un-shared, encoder instance with the state copied from the previous encoder to maintain audio continuity. Participants in the non-speaking set, or non-speaking state, may be grouped by their participant attribute signature and assigned to a matching encoder, which may be shared by other non-speaking participants.

In an embodiment, when a participant transitions from a speaking state to non-speaking state, that participant may be assigned a shared encoder state. Continuity is not guaranteed in this instance for statefull encoders, such as G.729, for example, and a short audible artifact may be introduced into the call, however, this effect is negligible. Control is passed to operation 220 and process 200 continues.

In operation 225, unique mixes are produced. For example, the mixer may create audio for all participants. All of the non-speaking participants hear the same audio and thus, they receive a mix of all speaking participants. For each of the speaking participants, a mix is created of all the other speaking participants, e.g., each speaker receives the common mix minus their own input audio. Control is passed to operation 230 and process 200 continues.

In operation 230, audio is encoded for each party and sent. For example, the appropriate conference audio is prepared and written to each unique encoder instance. That encoded audio is then written to each participant associated with that encoder instance. The encoded audio is then sent. For non-contributing parties which share the same encoder signature, a single encoding of that mix is produced and sent to those parties. Thus, the assigned encoders are used to perform the minimal number of encodings to satisfy all parties to the conference. The process 200 ends.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for reducing computational complexity of participants in a voice-over-IP conference communication setting through recognition and elimination of redundant operations, wherein said method comprises steps of:
   a. receiving audio for participants to the conference communication setting by a means for signal processing;
   b. determining a state for each participant, by the means for signal processing wherein each participant is assigned an active state or a non-active state;
   c. processing, by a conference system, said audio to generate return audio for each participant, wherein said processing comprises:
      i. recognizing the non-active state participants using similar audio encoding formats and which are receiving similar audio; and
      ii. producing a single encoding of the similar audio, whereby the redundant similar audio has been removed, for the non-active participants having similar attributes; and
   d. transmitting, by the conference system, said return audio to said participants, wherein said participants having similar attributes receive the return audio with eliminated redundant operations.

2. The method of claim 1, wherein the attributes comprise one or more of: compression format, packetization size, gain setting, IVR audio, and Auxiliary audio.

3. The method of claim 1, wherein the encoding of said similar audio for participants having similar attributes comprises:
   a. encoding a bit pattern identifying attributes of a participant; and
   b. combining said bit patterns for all attributes to form a signature.

4. The method of claim 3, wherein the signature is formed as a 64-bit unsigned integer with a bit range reserved for an attribute.

5. The method of claim 4, wherein the bit ranges comprise: 0-15, 16-23, 24-27, 28-35, 36-51, and 52-64.

6. The method of claim 1, wherein step (c.i.) is performed by a means for conference mixing, further comprising steps of:
   a. reading a segment of audio equal to a time interval for each participant;
   b. determining which participants contribute to the audio for said time interval and assigning to at least two sets the participants;
   c. assigning a unique encoder instance to each set of participants;
   d. preparing the audio and writing the audio to a unique encoder instance, wherein
      i. the audio is analyzed to determine which inputs contribute to the audio;
      ii. an output participant list is formed from the analysis;
      iii. an encoder is assigned to each participant output; and
      iv. the required number of unique mixes are produced by a means for mixing; and
   e. writing said encoded audio to each participant associated with an encoder instance.

7. The method of claim 6, wherein the time interval is 10 milliseconds.

8. The method of claim 6, wherein the time interval is 20 milliseconds.

9. The method of claim 6, wherein the determining of step (b) is made based on at least one of: the audio segment, the current state of the participant, the prior state of the participant, the prior state of the participant as to the speaking state of an other participant, and conference settings.

10. The method of claim 1, wherein the active participants are speaking.

11. The method of claim 6, wherein the encoder instance is assigned by designated criteria.

12. The method of claim 11, wherein the designated criteria comprise:
   a. determining if a participant is contributing for the time interval and,
      i. if the participant is contributing for said time interval and has an assigned encoder instance shared with at least one other participant, the participant is assigned a new unique encoder instance with the state copied from the previous encoder instance to maintain audio continuity; and
      ii. if the participant is not contributing for said time interval, grouping the participant with any other participants based on attribute signature, and assigning the participants in the group a matching encoder.

13. The method of claim 12, wherein the number of encoder instances is equal to the number of participants.

14. The method of claim 1, wherein a participant is determined to be contributing by an alert sent by a signal processor when a participant begins producing desired sounds.

15. The method of claim 14, wherein said desired sounds comprise speech.

16. The method of claim 1, wherein there is a configured maximum number of conference participants who contribute and said configuration is capable of being exceeded temporarily.

17. The method of claim 1, wherein said similar audio comprises identical encoding formats.

18. The method of claim 1, wherein said conference communication setting comprises a video conference.

19. The method of claim 1, wherein said operations comprise encodings.

20. A method for reducing computational complexity of participants in a voice-over-IP conference call setting through recognition and elimination of redundant encodings, wherein said method comprises steps of:

a. receiving an alert from a signal processor when a participant begins producing sound;

b. adding said participant, by the signal processor, to a listing of active participants, wherein said active participants are producing sound;

c. determining, by the signal processor, if the sound from said participant is speech, wherein the participant is removed from the listing if said sound is determined not to be speech;

d. recognizing, by a conference system, if participants who are determined to not be active are using a similar audio encoding format and are receiving similar audio;

e. producing, by the conference system, a single encoding of the similar audio, whereby the redundant similar audio has been removed, for the participants having similar attributes who are determined to not be active; and f. preparing and writing, by the conference system, said encoded audio to each participant associated with an encoder instance.

21. The method of claim 20, wherein step (d) comprises steps of:

a. identifying attributes of a participant and encoding a bit pattern identifying a value assigned to said attributes;

b. combining said bit patterns for attributes to form a signature with bit ranges reserved for each attribute, wherein participants are using a similar audio encoding format and receiving similar audio if they have the same signature and they are not in the listing of active participants.

22. The method of claim 20, wherein step (f) further comprises steps of:

a. preparing an audio buffer containing a sum of the audio input by active participants; and b. preparing a buffer containing audio from the buffer prepared in step (a) less the audio from the not active participants.

23. The method of claim 20, wherein encoding said similar audio includes assigning an encoder instance using designated criteria.

24. The method of claim 23, wherein said designated criteria comprise:

a. assigning a unique encoder instance with a state copied from a previous encoder instance to maintain audio continuity to an active participant; and b. assigning a shared encoder instance to a grouping of non-active participants by attribute signature.

25. The method of claim 21, wherein the attributes comprise one or more of: compression format, packetization size, gain setting, IVR audio, and Auxiliary audio.

26. The method of claim 21, wherein the signature is formed as a 64-bit unsigned integer with a bit range reserved for an attribute.

27. The method of claim 26, wherein the bit ranges comprise: 0-15, 16-23, 24-27, 28-35, 36-51, and 52-64.

28. The method of claim 20, wherein a participant is determined to be active based on at least one of: audio segment, current state of the participant, prior state of the participant, prior state of the participant as to the speaking state of an other participant, and the conference settings.

29. The method of claim 20, wherein said conference call setting comprises a video conference.

* * * * *